Sept. 24, 1935.  O. L. HOWLAND  2,015,074
MANUFACTURE OF WELDING ROD OR WIRE
Original Filed Jan. 24, 1931   3 Sheets-Sheet 1
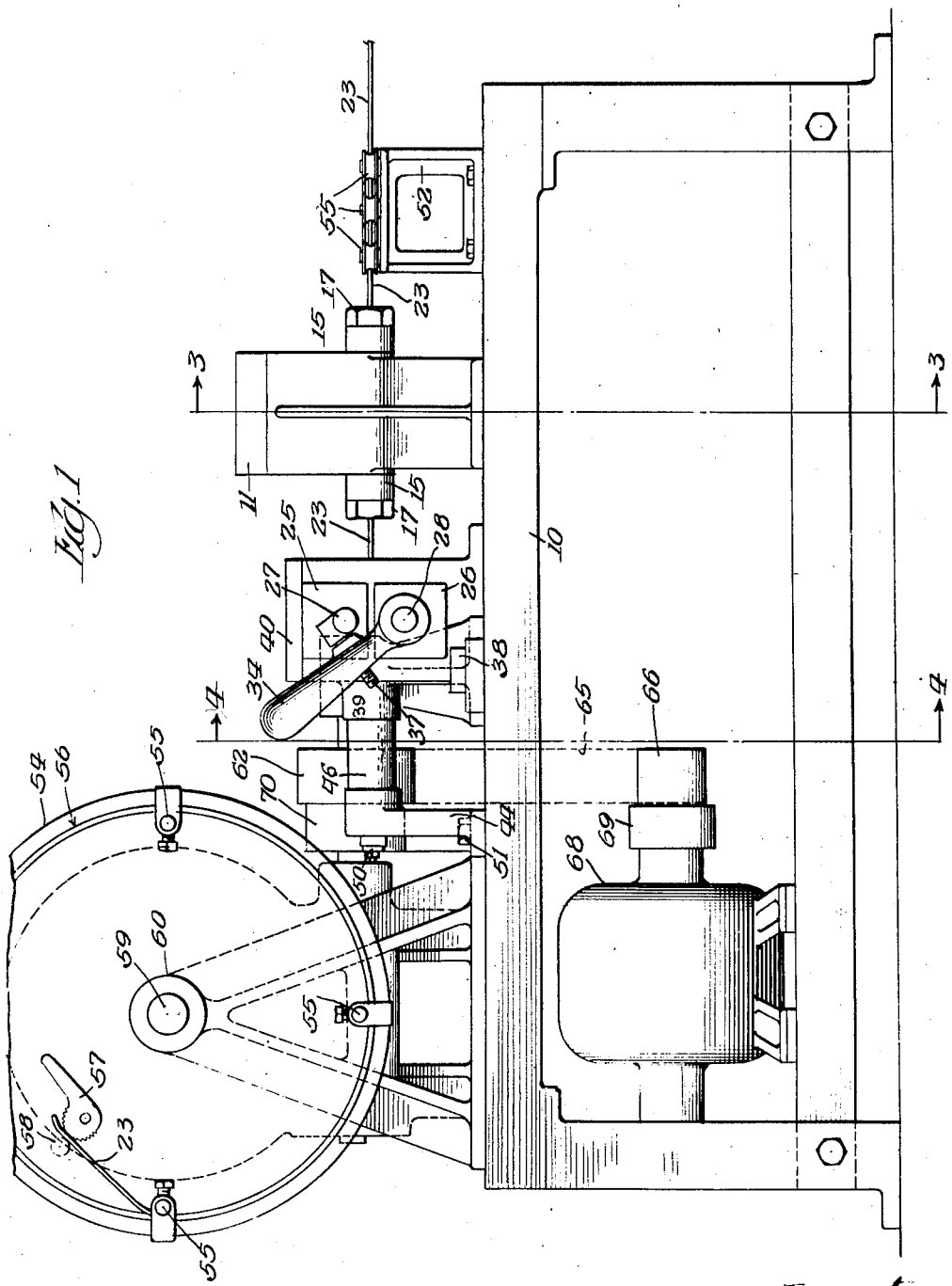

Sept. 24, 1935.   O. L. HOWLAND   2,015,074
MANUFACTURE OF WELDING ROD OR WIRE
Original Filed Jan. 24, 1931   3 Sheets-Sheet 2
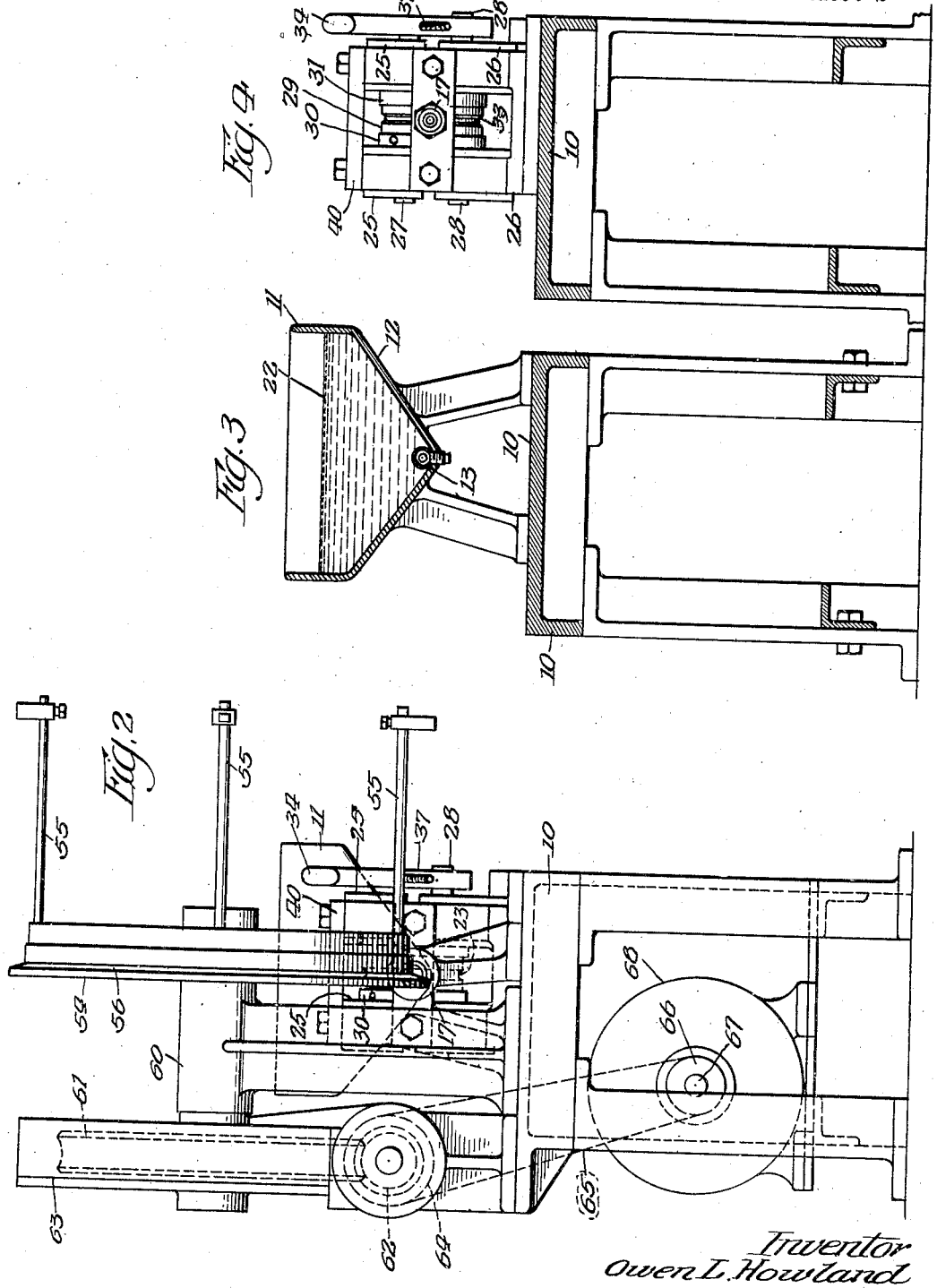

Sept. 24, 1935.  O. L. HOWLAND  2,015,074
MANUFACTURE OF WELDING ROD OR WIRE
Original Filed Jan. 24, 1931  3 Sheets-Sheet 3
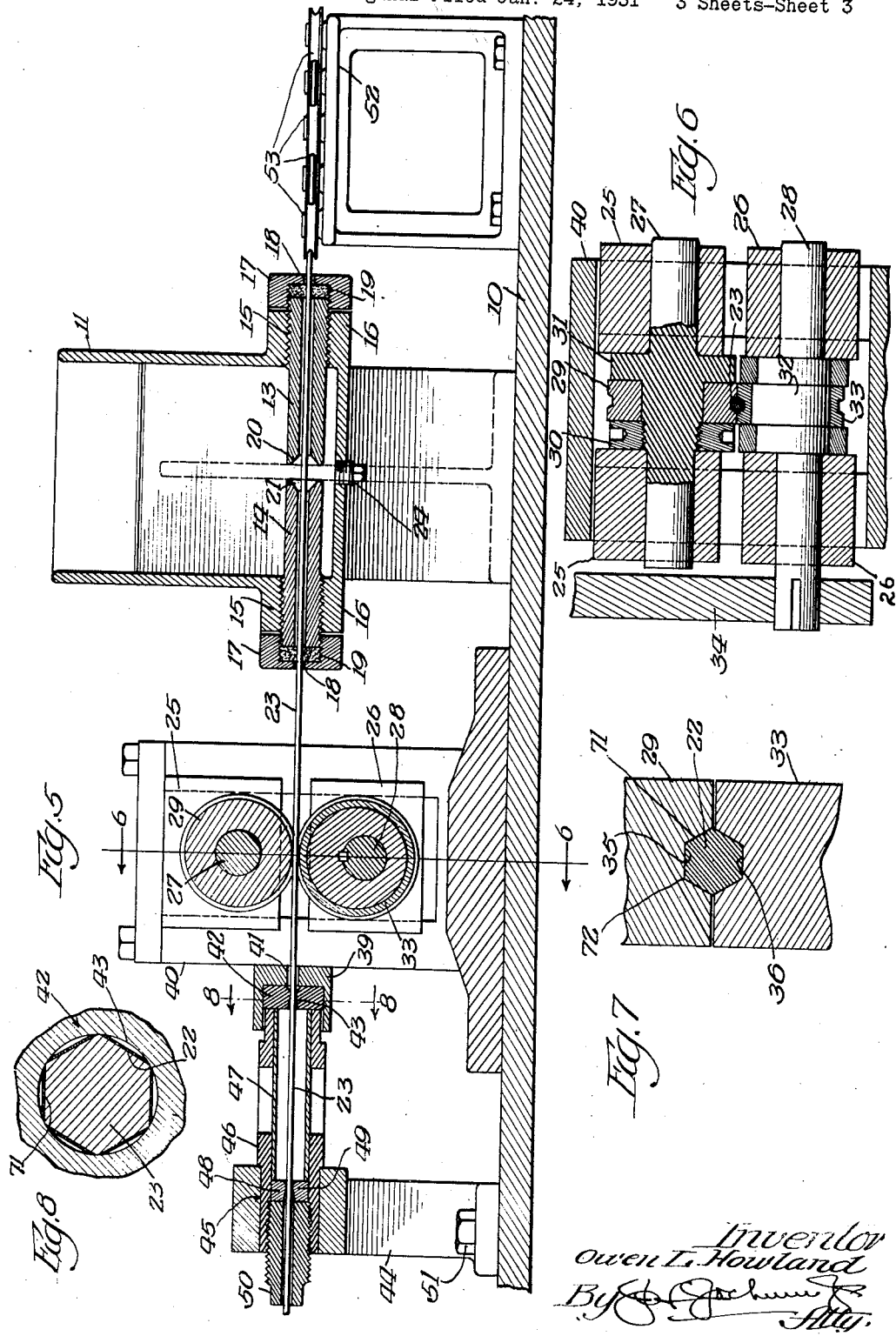

Patented Sept. 24, 1935

2,015,074

UNITED STATES PATENT OFFICE 2,015,074

MANUFACTURE OF WELDING ROD OR WIRE

Owen L. Howland, Maywood, Ill., assignor, by mesne assignments, to Una Welding, Inc., Cleveland, Ohio, a corporation of Delaware Application January 24, 1931, Serial No. 510,888
Renewed November 22, 1934

15 Claims. (Cl. 219—8)

This invention relates to improvements in manufacture of rods or wire for welding purposes and which rod or wire is provided with a coating of flux, and one of the objects of the invention is to provide an improved machine and process for carrying this invention into effect.

A further object is to shape the rod or wire to provide one or more flat sides, and at the same time provide an edge or surface from which the coating is removed, so that when the finished rod is passed through the feeding rolls of the welding machine, the portion of the surface which has been left bare, will provide an electrical contact throughout the length of the rod.

A further object is to provide improved means for applying a coating of flux to the surface of the rod and then subjecting the rod to pressure to shape the same, and at the same time press the flux or coating into the body of the rod which also increases the density of the rod and insures a more uniform deposit and greater penetration into the work. Furthermore, the rod will carry greater heat values which will result in greater speed in the deposit.

To the attainment of these ends and the accomplishment of other new and useful objects as will appear, the invention consists in the improved method hereinafter set forth, and in the features of novelty, in the construction, combination and arrangement of the several parts of a machine for carrying this invention into operation, and in the accompanying drawings illustrating a type of machine adapted for such purpose, Figure 1 is a side elevation.

Figure 2 is a left hand end elevation of Figure 1, with parts omitted.

Figure 3 is a detail sectional view taken on line 3—3, Figure 1.

Figure 4 is a detail sectional view taken on line 4—4, Figure 1.

Figure 5 is a vertical, longitudinal sectional view of the machine, with parts omitted.

Figure 6 is a detail sectional view taken on line 6—6 Figure 5.

Figure 7 is an enlarged detail sectional view of a portion of the shaping rolls.

Figure 8 is a detail sectional view taken on line 8—8, Figure 5.

Throughout the specification and claims the term rod will be employed to designate the product produced in accordance with the principles of this invention, but it is to be understood that this is not to be considered as a term of limitation as it is to be construed broadly to cover a rod, wire, strip or the like.

Referring more particularly to the drawings the numeral 10 designates a suitable supporting structure upon which the machine is mounted, and arranged at any convenient point intermediate the ends of the structure is a tank or receptacle 11, which is preferably provided with a trough or V shaped bottom 12, and projecting into the tank from opposite sides thereof are tubular members 13—14. Each of these members is adjustably mounted, such as by means of threads 15 in suitable bearings 16, and engaging the respective threads 15 of the members 13 and 14 are caps 17, each of which is provided with an opening 18 in alinement with the openings in the respective tubular members 13—14. Packing material 19 is provided between the caps 17 and the respective ends of the members 13 and 14, and serve as a means to prevent the material from the tank 11 from flowing therefrom through the open ends of the tubular members 13—14.

The inner extremities of the tubular members 13—14 terminate short of each other within the tank 11, but are preferably disposed in close proximity to each other. The adjacent extremities of these members are preferably provided with conical recesses 20—21 and are opposed to each other to serve as a means for directing the fluxing material 22 which is contained within the tank 11, against the surface of the rod or wire 23, as the latter passes through the tank 11.

A clean out plug 24 may be provided in the bottom of the tank 11, if desired.

Arranged to one side of the tank 11 and mounted in suitable bearings 25—26 are shafts 27—28.

Loosely mounted on the shaft 27 is a shaping roll 29, and this roller is held in position against lateral displacement in any suitable manner such as by means of a collar 30, threaded upon the shaft which co-operates with a flange 31 on the shaft, and between which collar and flange the roller is arranged.

Secured to the shaft 28 is an eccentric 32 and encompassing the eccentric is a roller 33, and connected with the shaft 28 is a handle 34 so that by operating the handle the shaft 28 will be rotated in the bearings 26 and the eccentric 32 will cause the roller 33 to be moved toward and away from the roller 29, according to the direction of movement of the handle 34.

The peripheries of the rollers 29 and 33 are provided with annular grooves, and these grooves are shaped according to the configuration which it is desired to impart to the rod. In the present exemplification of the invention and as shown more clearly in Figure 7, the grooves 35—36 respectively in the rollers 29—33 are so shaped that when they co-operate they will form a hexagonal space therebetween so that when the rod 23 is passed between the rollers it will be given a corresponding shape in cross section.

Any suitable means may be provided for limiting the throw of the handle 34 in one direction, such as a screw 37 which is adapted to contact with a stop 38. Thus, by moving the handle 34 the rollers may be spread apart or brought together with respect to each other, as desired, so as to compensate operation upon the work and also varying sizes of diameters of the rods.

A bearing 39 is supported adjacent the rolls 29—32, preferably by means of the supporting structure 40 for the rolls and the bearing is provided with an opening 41 in alinement with the bite of the rolls and which opening is of a diameter considerably greater than the diameter of the rod.

Within the bearing is arranged a member 42 having an opening 43 therein which is circular in cross section and of a diameter to allow the rod to pass freely therethrough.

An adjustable support or standard 44 is provided with a bearing 45 and into the bearing 45 projects one end of a supporting member 46, the other end of the member 46 projecting into the bearing 39 and abutting the member 42. Within the member 46 is arranged a tubular member 47 of a diameter considerably greater than the diameter of the opening 43 in the member 42, and one end of this tubular member 47 abuts the member 42, while the other end abuts another member 48, similar to the member 42, and which member 48 is provided with an opening 49 similar to the opening 43 and of substantially the same size.

A hollow plug 50 is threaded into the end of the member 46 to abut the member 48 and as the member 48 abuts the end of the tubular member 47, and the other end of the member 47 abuts the member 42, it will be manifest that by adjusting the plug 50 in a direction to force these parts together, they will be firmly held in position and the opening in the plug 50 is in alinement with the openings in the members 48 and 42 but is of a diameter considerably greater than the diameter of the openings 49—43.

In order to remove the members 48—42 as well as the member 46, any suitable manner of mounting the same may be provided, and this end may be accomplished by mounting the upright or standard 44 for bodily adjustment toward and away from the supporting structure 40 and the same may be held in its adjusted position by means of fastening bolts 51.

Arranged in advance of the tank 11 is a supporting structure 52 upon which is mounted a series of rollers 53 rotatable freely about upright axes and between which rollers the wire 23 is fed before entering the tank 11, so as to straighten the wire.

In operation the wire is drawn between the rolls 53, through the tank 11, between the rolls 33 and 29, through the members 42—48 and wound upon a reel which consists of a body portion 54 having arms 55 projecting laterally therefrom. The body portion 54 is beveled as at 56 to assist in reeling the wire, and carried by the reel 54 is a clamp 57 which co-operates with an abutment 58 to clamp the end of the wire 23 to the reel. The reel is rotatably mounted upon a shaft 59 journaled in a suitable bearing 60, and the reel may be rotated in any desired or suitable manner preferably by means of a worm gear 61, with which a worm 62 meshes and the worm gear 61 may be encased within a housing 63, the worm 62 being preferably driven by means of a pulley 64, over which a belt 65 passes. The belt also passes over a pulley 66 on the shaft 67 of a motor 68.

If desired an additional set of pulleys 69—70 may be respectively connected with the shaft 67 and the worm 62 and on to which additional pulleys the belt 65 may be shifted, for the purpose of imparting a different speed of rotation to the reel 54.

The operation of the reel 54 feeds the wire 23 through the machine.

By adjusting the lever 34 on the lower shaping roll 33, it will be manifest that any degree of pressure may be exerted upon the wire as it is passing between the shaping rolls.

The operation of the device and of the method is as follows.

The wire is fed continuously through the tank 11 and between the shaping rolls 29—33 by the operation of the reel.

The wire is first straightened by the rolls 53 and passes into the tank 11, and during its movement through the tank the fluxing material is forced against the periphery of the wire by the ends 20—21 of the tubular members 13—14. The shaping rolls 29—33 then receive the coated wire and as the wire is passing between the rolls the operation of the rolls upon the wire not only shapes the wire to form the flat surface or surfaces 71 but also forms the angles 72 on the periphery of the rod. The number of angles thus formed depend upon the shape of the rod in cross section and these angles or edges 72 extend throughout the length of the rod.

During the operation of the rollers 29—33 upon the coated rod, the coating, or flux is forced into the body of the rod and at the same time and by changing the shape of the rod the density of the rod itself is increased, with the result that there will be insured a more uniform deposit and greater penetration into the work when the rod is used in the welding machine, and the rod will also carry greater heat values, which will result in greater speed in deposit.

From the rollers 29—33 the shaped and coated rod will pass between the members 42 and 48 which may be suitably spaced from each other according to the length of the tubular member 47.

Inasmuch as the openings 43 and 49 respectively in the members 42 and 48 are circular in cross section and as the rod shaped by the rollers 29—33 is irregular or angular in cross section or is provided with one or more flat surfaces to produce one or more longitudinal edges 72, these edges will contact with the walls of the openings 43—49 in the members 42—48 and the coating or flux which covers such edge will be wiped therefrom, leaving the edges bare so that when the rod is fed through the welding machine any one or more of these edges will contact with the feed rollers of the machine to provide an electrical contact throughout the length of the rod.

While the preferred form of machine for carrying this process into effect and the preferred method of producing the rods have been herein shown and described, it is to be understood that various changes may be made in the machine and in the steps of the method or process, within the scope of the claims, without departing from the spirit of this invention.

What is claimed as new is:—

1. The method of manufacturing a flux carrying rod which consists in first coating the rod with a flux, then subjecting the rod to pressure to force a portion of the flux into the body of the rod, and at the same time change the shape of the rod to produce a clearly defined edge extending lengthwise of the rod, and then removing from said edge flux carried thereby.

2. The method of manufacturing a flux carrying rod which consists in first coating the rod with a flux, then subjecting the rod to pressure to force a portion of the flux into the body of the rod, and at the same time change the shape of the rod so that the rod will have diameters of different lengths in the same cross sectional plane to produce a clearly defined zone extending lengthwise of the rod, and then wiping from said zone flux that may be carried thereby.

3. The method of manufacturing a flux carrying welding rod which consists in applying a coating of flux to the rod, compressing the rod to force some of the coating into the body of the rod, and then removing the flux from a clearly defined zone upon the rod to provide a bare electrical contact portion extending substantially throughout the length of the rod.

4. The method of manufacturing a flux carrying welding rod which consists in applying flux to the rod, and then shaping the rod to provide one or more substantially flat peripheral portions to provide a clearly defined electrical contact edge throughout the length of the rod.

5. The method of manufacturing a flux carrying welding rod which consists in applying flux to the rod, then shaping the periphery of the rod to provide a clearly defined zone extending lengthwise of the rod, and then wiping from said zone flux that may be carried thereby within said zone to provide a bare surface.

6. The method of manufacturing flux carrying welding rods which consists in applying a coating of flux to the surface of the rod, then shaping the rod to form a rib or clearly defined edge extending lengthwise of the rod, and then wiping from said edge flux that may be carried thereby.

7. The method of manufacturing a flux carrying welding rod which consists in applying a coating of flux to the rod, then forcing a portion of the applied coating into the body of the rod, and subsequently removing flux from a clearly defined zone to provide a bare electrical contact space extending lengthwise of the rod.

8. The method of manufacturing a flux carrying welding rod which consists in applying a coating of flux to the rod, then pressing the coated rod to force a portion of the applied coating into the body of the rod, and subsequently removing flux from a clearly defined zone to provide a bare electrical contact space extending lengthwise of the rod.

9. The method of manufacturing a flux carrying welding rod which consists in forming a rod, the surface of which is coated with flux, so that the rod will have diameters of different lengths in the same cross sectional plane to produce one or more clearly defined edges extending lengthwise of the rod, and then removing flux from said edge or edges only.

10. The method of manufacturing a flux carrying welding rod which consists in forming a rod, the surface of which is coated with flux, so that the rod will have diameters of different lengths in the same cross sectional plane to produce one or more clearly defined edges extending lengthwise of the rod, and then wiping the flux from said edge or edges only to provide electrical contact surfaces extending lengthwise of the rod.

11. The method of making welding wire, consisting of applying a coating of flux to a rod, then removing portions of the flux from a plurality of clearly defined zones therealong to provide zones for electrical contact extending therealong.

12. The method of making welding wire consisting of applying a coating of flux to a rod, then removing portions of the flux from a plurality of zones therealong to provide continuous zones for electrical contact extending therealong.

13. The method of making welding wire consisting of applying a coating of flux to a rod, then removing portions thereof to provide electrical contact zones therealong symmetrically spaced around the rod.

14. The method of making welding wire consisting of applying a coating of flux thereto, deforming the rod to polygonal shape in cross section, and then removing the flux from the edges thereof to form contact zones.

15. The method of making welding wire consisting of applying a coating of flux thereto, deforming the rod to the shape of a regular polygon in cross section, then removing the flux from a plurality of zones on the rod, symmetrically spaced thereabout.

O. L. HOWLAND.